United States Patent
Crofut et al.

(10) Patent No.: US 6,377,026 B1
(45) Date of Patent: Apr. 23, 2002

(54) BATTERY FOR A CHILDREN'S RIDE-ON VEHICLE

(75) Inventors: Chuck J. Crofut, East Aurora; Brian L. Bienz, Orchard Park, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/585,677

(22) Filed: Jun. 1, 2000

Related U.S. Application Data

(63) Continuation-in-part of application No. 09/357,065, filed on Jul. 19, 1999.

(51) Int. Cl.[7] .............................................. H01M 17/46

(52) U.S. Cl. ...................................... 320/134; 320/136

(58) Field of Search ................................ 320/110, 112, 320/113, 134, 136

(56) References Cited

U.S. PATENT DOCUMENTS

| | | |
|---|---|---|
| 3,066,643 A | 12/1962 | Flanagan, Jr. |
| 3,186,878 A | 6/1965 | Filander |
| 3,194,688 A | 7/1965 | Riley, Jr. et al. |
| 3,462,726 A | 8/1969 | Stark et al. |
| 3,533,119 A | 10/1970 | Dokos |
| 3,562,698 A | 2/1971 | Merry |
| 3,728,787 A | 4/1973 | McDonough |
| 3,980,370 A | 9/1976 | Gonzalez-Hernandez |
| 3,980,385 A | 9/1976 | Hirokawa et al. |
| 3,982,084 A | 9/1976 | Cooperstein |
| 3,998,518 A | 12/1976 | Mathe |
| 4,072,800 A | 2/1978 | Gammer |
| 4,084,123 A | 4/1978 | Lineback et al. |
| 4,191,917 A | 3/1980 | Brown et al. |
| 4,216,839 A | 8/1980 | Gould et al. |
| 4,217,400 A | 8/1980 | Leffingwell |
| 4,224,383 A | 9/1980 | Taylor |
| 4,389,551 A | 6/1983 | Deibele et al. |
| 4,393,283 A | 7/1983 | Masuda |
| 4,426,558 A | 1/1984 | Tanaka et al. |
| 4,436,792 A | 3/1984 | Tomino et al. |
| 4,447,749 A | 5/1984 | Reeb, Jr. et al. |
| 4,450,400 A | 5/1984 | Gwyn |
| 4,481,458 A | 11/1984 | Lane |
| 4,528,429 A | 7/1985 | Dobson et al. |
| 4,550,972 A | 11/1985 | Romak |
| 4,555,849 A | 12/1985 | Ando et al. |
| 4,575,704 A | 3/1986 | Pezold |
| 4,578,628 A | 3/1986 | Siwiak |
| 4,671,524 A | 6/1987 | Haubenwallner |
| 4,726,775 A | 2/1988 | Owen |
| 4,728,876 A | 3/1988 | Mongeon et al. |
| 4,751,452 A | 6/1988 | Kilmer et al. |
| 4,756,978 A | 7/1988 | Nitcher et al. |
| 4,772,215 A | 9/1988 | Falk |
| 4,835,410 A | 5/1989 | Bhagwat et al. |
| 4,847,513 A | 7/1989 | Katz et al. |
| 4,861,684 A | 8/1989 | Law |
| 4,871,629 A | 10/1989 | Bunyea |
| 4,923,416 A | 5/1990 | Zinn |
| 4,927,787 A | 5/1990 | Patel |
| 4,957,829 A | 9/1990 | Holl |
| 4,995,017 A | 2/1991 | Sellati et al. |
| 5,023,417 A | 6/1991 | Magiera |

(List continued on next page.)

Primary Examiner—Edward H. Tso
(74) Attorney, Agent, or Firm—Kolisch, Hartwell, Dickinson, McCormack & Heuser, PC

(57) ABSTRACT

An improved battery for children's ride-on vehicles. The battery includes a sealed housing that contains an internal circuit breaker that disconnects the flow of energy from the battery to the vehicle's one or more motors upon actuation. Upon removal of the actuating event, the circuit breaker automatically resets to reestablish the electrical circuit connecting the battery and the vehicle's one or more motors. The battery may alternatively include a manual reset that is accessible external the housing. Additionally, the battery may also include an internal one-shot fuse to protect against catastrophic failure of the battery.

23 Claims, 4 Drawing Sheets

U.S. PATENT DOCUMENTS

| | | |
|---|---|---|
| 5,036,938 A | 8/1991 | Blount et al. |
| 5,065,082 A | 11/1991 | Fushiya |
| 5,075,518 A | 12/1991 | Matsumoto |
| 5,095,182 A | 3/1992 | Thompson |
| 5,120,617 A | 6/1992 | Cameron |
| 5,145,391 A | 9/1992 | Alwine |
| 5,145,422 A | 9/1992 | Fry |
| 5,146,149 A | 9/1992 | Nilssen |
| 5,180,310 A | 1/1993 | Miller |
| 5,186,639 A | 2/1993 | Comerci et al. |
| 5,188,545 A | 2/1993 | Hass et al. |
| 5,208,525 A | 5/1993 | Lopic et al. |
| 5,213,913 A | 5/1993 | Anthony, III et al. |
| 5,217,824 A | 6/1993 | Womack |
| 5,224,870 A | 7/1993 | Weaver et al. |
| 5,224,885 A | 7/1993 | Youngfleish |
| 5,229,703 A | 7/1993 | Harris |
| 5,234,066 A | 8/1993 | Ahsing et al. |
| 5,237,742 A | 8/1993 | McClune |
| 5,260,636 A | 11/1993 | Leiserson et al. |
| 5,298,821 A | 3/1994 | Michel |
| 5,360,307 A | 11/1994 | Schemm et al. |
| 5,362,260 A | 11/1994 | Peloza |
| 5,368,954 A | 11/1994 | Bruns |
| 5,374,199 A | 12/1994 | Chung |
| 5,378,552 A | 1/1995 | Dixon, Jr. |
| 5,378,553 A | 1/1995 | Shoji |
| 5,378,555 A | 1/1995 | Waters et al. |
| 5,401,591 A | 3/1995 | Bishay et al. |
| 5,401,592 A | 3/1995 | Gilpin et al. |
| 5,411,534 A | 5/1995 | Dieken et al. |
| 5,422,198 A | 6/1995 | Lin |
| 5,434,494 A | 7/1995 | Perego |
| 5,435,748 A | 7/1995 | Abe |
| 5,462,445 A | 10/1995 | Anhalt |
| 5,477,936 A | 12/1995 | Sugioka et al. |
| 5,487,686 A | 1/1996 | Sawada |
| 5,513,999 A | 5/1996 | Fry et al. |
| 5,534,364 A | 7/1996 | Watanabe et al. |
| 5,549,981 A | 8/1996 | Maly-Schreiber et al. |
| 5,689,173 A | 11/1997 | Oosaki et al. |
| 5,928,020 A | 7/1999 | Bishop, Jr. et al. |
| 5,948,556 A | 9/1999 | Hall et al. |

US 6,377,026 B1

BATTERY FOR A CHILDREN'S RIDE-ON VEHICLE

CROSS-REFERENCE TO RELATED APPLICATION

This application is a continuation in part of and claims priority to U.S. patent application Ser. No. 09/357,065, which was filed on Jul. 19, 1999 and the disclosure of which is hereby incorporated by reference.

FIELD OF THE INVENTION

The present invention relates to powered ride-on vehicles for children, and more particularly to a battery for a children's ride-on vehicle.

BACKGROUND OF THE INVENTION

Powered ride-on vehicles for children typically use a chargeable battery that supplies power to an electric motor that drives one or more wheels on the vehicle. A child rider can control movement of the vehicle by stepping on or releasing a foot-pedal switch interposed between the battery and the motor.

Ride-on vehicles are subject to being driven on a variety of surfaces, including concrete, dirt and grass, as well as up and down hills. As a result, the power requirements for ride-on vehicles vary dramatically during operation. In particular, when driving level or downhill on hard surfaces, the motor draws relatively little current, such as a current −2–5 amps. However, when traveling uphill or over rough surfaces like grass and dirt, substantially more current is required. Similarly, when a child instantaneously starts the vehicle at full speed, such as by pressing the foot-pedal from an unactuated position to a fully actuated position, a very large instantaneous current is drawn from the battery. This current typically may be approximately 100 amps. Thus, the motor, switches, battery and wiring must be capable of handling relatively high currents.

However, the vehicles still need to protect against short circuits, current overloads and other battery conditions that can damage the vehicle as well as its rider. In the past, batteries with externally accessible fuses have been used with children's ride-on vehicles. When a triggering event occurs, the fuse blows and needs to be replaced before powered operation of the vehicle may resume. Because the fuses are externally accessible, parents and children are able to access the fuses, the carrier that receives the fuse, and in some embodiments, the wiring interconnecting the fuse with the rest of the battery. This access is undesirable because objects other than acceptable fuses may be used when an acceptable fuse is not available. This alone may result in damage to the user, battery or the vehicle. It may also result in loosing of the terminals used to connect the fuse with the battery. Moreover, it may leave the battery unprotected against short circuits and overloads. Similarly, the parent or child may be injured, or the battery may be damaged, if the parent or child accesses the batteries' wiring, cells and other components that are normally housed within its shell.

SUMMARY OF THE INVENTION

The present invention provides an improved battery for children's ride-on vehicles. The battery includes a sealed housing that contains an internal circuit breaker that disconnects the flow of energy from the battery to the vehicle's one or more motors upon actuation. Upon removal of the actuating event, the circuit breaker automatically resets to reestablish the electrical circuit connecting the battery and the vehicle's one or more motors. The battery may alternatively include a manual reset that is accessible external the housing. Additionally, the battery may also include an internal one-shot, or non-resettable fuse.

Many other features of the present invention will become manifest to those versed in the art upon making reference to the detailed description which follows and the accompanying sheet of drawings in which preferred embodiments incorporating the principles of this invention are disclosed as illustrative examples only.

DETAILED DESCRIPTION AND BEST MODE OF THE INVENTION

Figure 1:
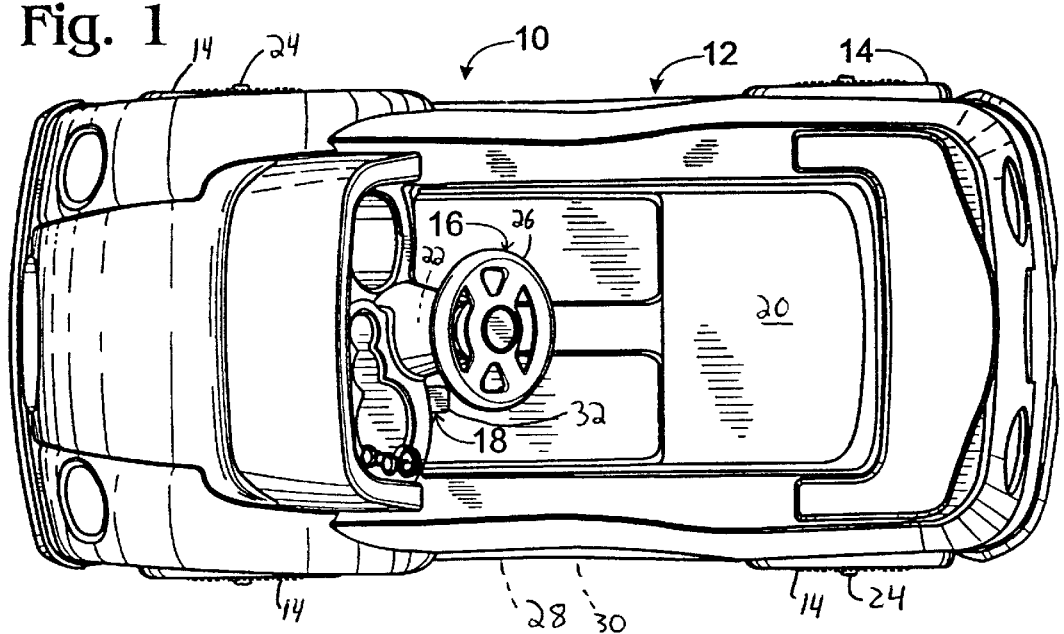
FIG. 1 is a top plan view of a powered children's ride-on vehicle according to the present invention.

A powered children's ride-on vehicle according to the present invention is shown generally at 10 in FIG. 1. Vehicle 10 includes a body or chassis 12, a plurality of wheels 14, a steering assembly 16, a speed control 18 and seat 20 sized to accommodate a child. As shown, body 12 generally resembles a full-sized automobile. It should be understood, however, that children's ride-on vehicles are reduced-scale vehicles designed to be operated by children at greatly reduced speeds compared to full-sized automobiles. Typically, the vehicles are sized to accommodate one or two young children, and are adapted to drive at speeds of a few miles per hour. The shape of body 12 may vary to resemble various full-sized vehicles, such as cars, trucks, motorcycles, all-terrain vehicles, and the like. Body 12 typically is partially formed from plastic, and often is at least substantially formed of plastic.

Steering assembly 16 communicates with at least one of the vehicle's wheels to control the direction at which the vehicle turns during powered operation. Typically, the steering assembly includes a steering column 22 that couples to one or more of the vehicle's wheels, or to the axles 24 upon which the wheels are mounted. As shown in FIG. 1, steering assembly 16 takes the form of a steering wheel 26. Steering assembly 16 may have other forms than steering wheel 26. For example, the steering assembly may include a rotatable handlebar instead of a steering wheel.

Speed control 18 regulates the rate at which the vehicle moves by selectively controlling the flow of current from the vehicle's one or more batteries 28 to one or more motors 30 that are adapted to drive the vehicle's wheels. Speed control 18 may be either an on/off or two-or three-position control, or alternatively may enable varying speeds of the vehicle depending upon the relative position of the control. As shown, speed control 18 includes a foot pedal 32, however, it may also or alternatively, include one or more on/off switches, forward and reverse switches, high and low speed switches. Similarly, the speed control may be positioned elsewhere on the vehicle's body or on its steering assembly.

Figure 2:
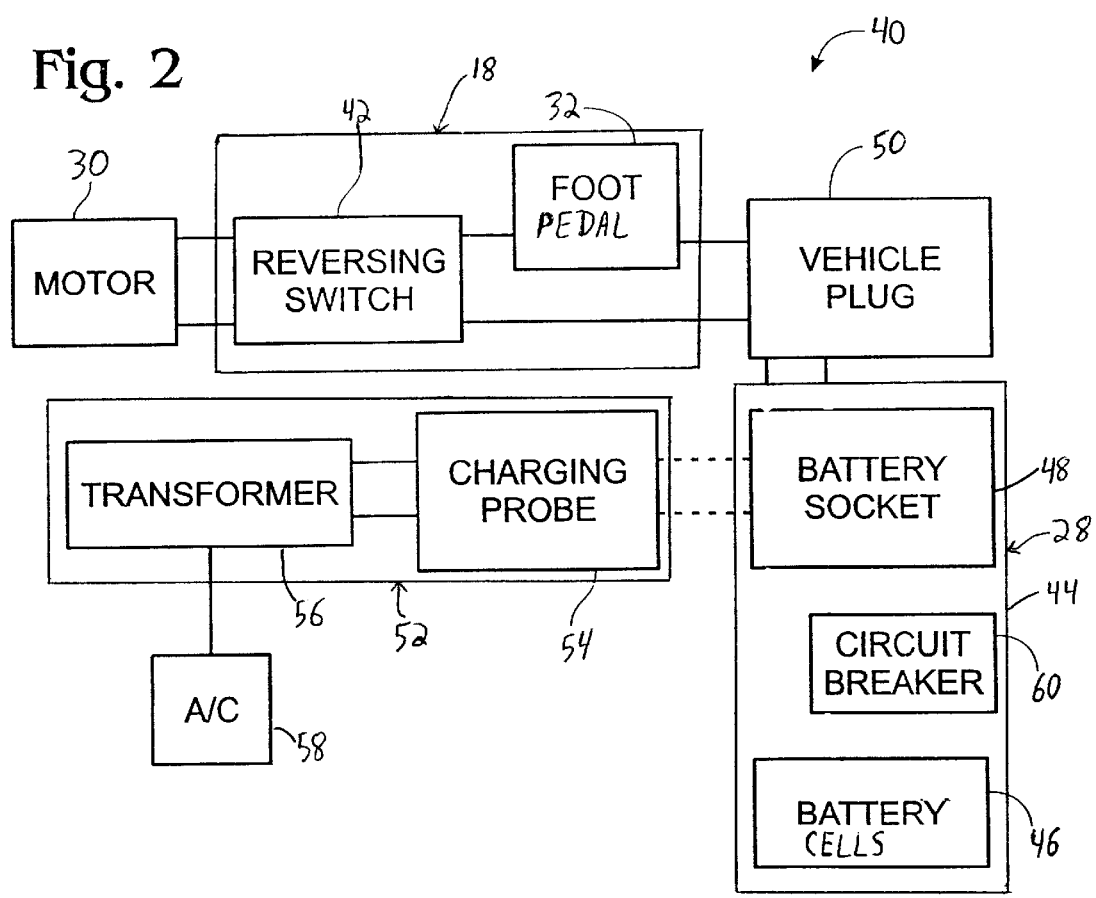
FIG. 2 is a schematic diagram of an electrical system of the vehicle of FIG. 1.

In FIG. 2, the vehicle's electrical system is shown at 40. As shown, system 40 includes the vehicle's speed control 18, motor or motors 30, and battery or batteries 28. In FIG. 2, speed control 18 is shown to foot pedal 32, and a reversing switch 42. As shown, battery 28 includes a housing 44 containing a plurality of cells 46 and a socket 48 that may be selectively coupled to a corresponding plug 50 to connect electrically the battery with the vehicle's motor or motors 30. Socket 48 may also be used to connect electrically the battery with a charger 52, which as shown includes a charging probe 54, and a transformer 56 in communication with an AC power source 58. It should be understood that battery 28 may include a plug, as opposed to socket 48. In this version, the plug is adapted to mate with corresponding sockets in charge, and the rest of the vehicles' electrical system.

Figure 3:
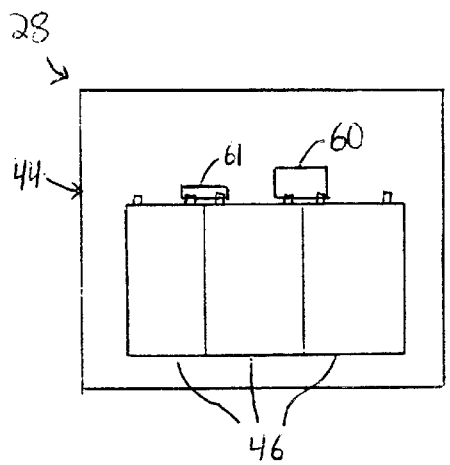
FIG. 3 is a schematic side-elevation view of an embodiment of the battery of FIG. 2.
Figure 4:
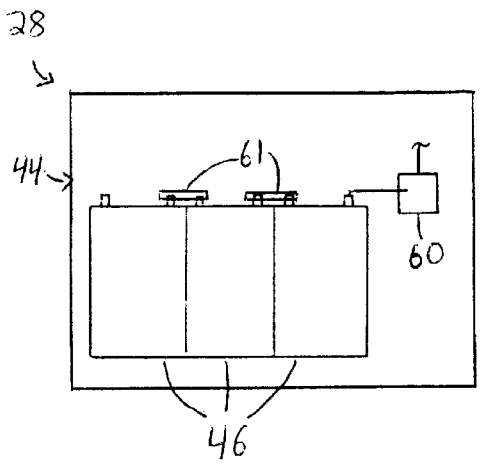
FIG. 4 is a schematic side-elevation view of another embodiment of the battery of FIG. 2.

Also shown in FIG. 2 is a circuit breaker 60, which is connected to the battery's cells 46 inside housing 44. The number of cells in a particular battery 28 may vary. For example, lead-acid cells are generally two-volt cells that may be coupled together to achieve the desired voltage for the battery. For a six-volt battery, three cells are connected in series, for a twelve-volt battery, six cells are used, etc. In FIG. 3, the circuit breaker is shown in series between cells 46. In FIG. 4, the circuit breaker is connected in series external the cells. Also shown in FIGS. 3 and 4 are linkages 61 interconnecting cells 46 other than those connected by circuit breaker 60.

Figure 5:
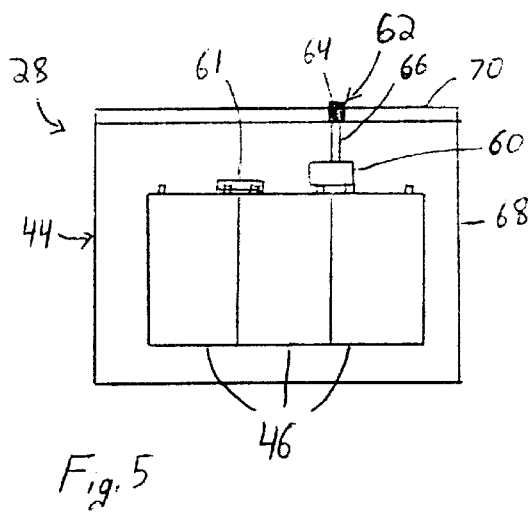
FIG. 5 is a schematic side-elevation view of another embodiment of a battery according to the present invention.

In contrast to a fuse, which must be replaced after overload, circuit breaker 60 may be reset after cooling or after the actuating event or load has passed. Circuit breaker may reset automatically after cooling. Alternatively, battery 28 may include a manual reset 62 that is accessible from external the battery's housing 28, such as shown in FIG. 5. Examples of suitable manual resets 62 are switches, pushbuttons or other suitable levers that include a user-accessible portion 64 that may be accessed from external the battery's housing, and an internal portion 66 that communicates with the circuit breaker to reset circuit breaker.

Preferably, housing 44 is a sealed housing that cannot be opened by a user. As such, housing 44 may be referred to as a tamper-resistant housing. Specifically, housing may be integrally formed as a monolithic unit, or more commonly, is formed from two or more components that are sealed together, such as by ultrasonic welding, adhesives, permanent fasteners (as opposed to screws, wing nuts and other reusable fasteners), and the like. For example, in FIG. 5, housing 44 is shown to include a main compartment 68 and a top, or cover, 70 that is permanently secured to the main compartment after assembly of the internal components of the battery. Because housing 28 is sealed, it eliminates the opportunity for the user to bypass the overload protection and thereby increases the safety of the battery and the vehicle. It also enables, but does not require, the components of the battery to be hard-wired or otherwise permanently secured together because the components do not need to be moved relative to each other. For Example, the circuit breaker may be directly soldered or otherwise coupled to the cell posts, thereby eliminating wires that could provide unprotected shorting of the battery.

Figure 6:
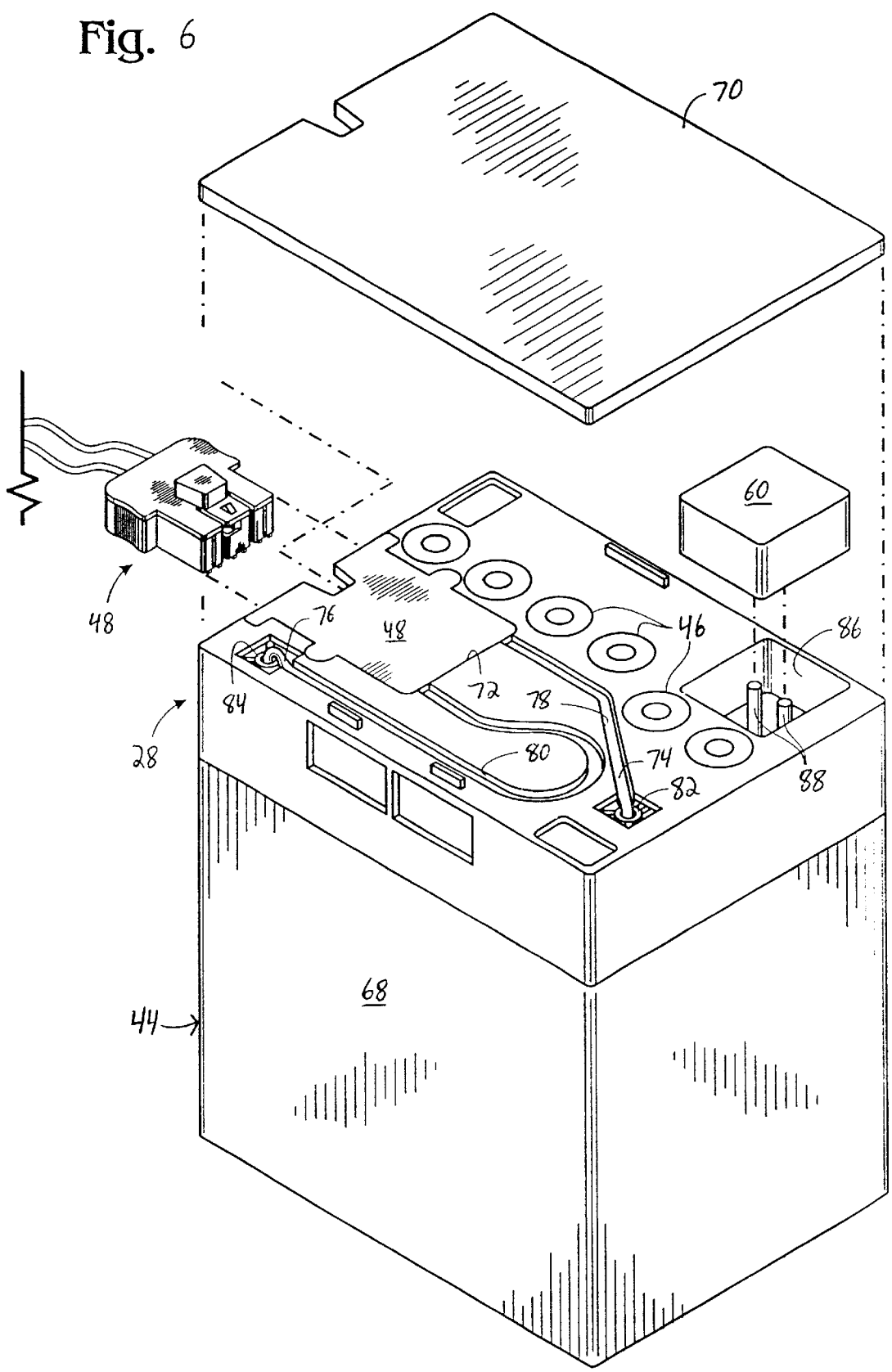
FIG. 6 is an exploded perspective view of a battery according to the present invention.

An embodiment of battery 28 is shown in FIG. 6 for purposes of illustration. As shown, battery socket 48 is disposed in a socket depression 72. Wires 74 and 76 extend from socket 48 along wire routing channels 78 and 80 to positive and negative cell posts 82 and 84. The battery also includes a circuit breaker depression 86 in which are disposed lead posts 88. The lead posts are connected to adjacent cells 46 within the battery. Circuit breaker 60 is received within circuit breaker depression 86 and provides an electrical connection between lead posts 88. It should be understood that the construction shown in FIG. 4 is for purposes of illustration, and that any other suitable construction may be used. For example, battery 28 may have an internal construction that does not include depressions 72 and 86.

Figure 7:
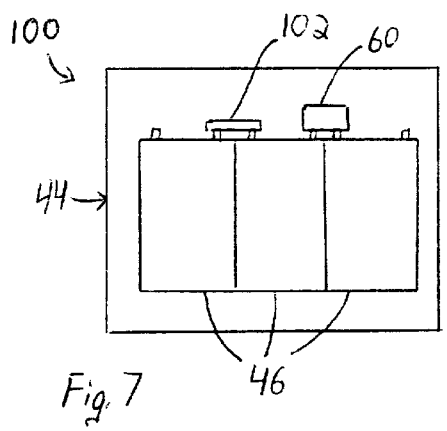
FIG. 7 is a schematic side-elevation view of another embodiment of a battery according to the present invention.

Another embodiment of the invented battery is shown in FIG. 7 and generally indicated at 100. Unless otherwise specified, battery 100 contains the same structure as battery 28 and is also adapted for use with a children's ride-on vehicle. In addition to the structure described with respect to battery 28, battery 100 further includes an internal fuse 102 that cannot be reset after actuation. Therefore, if fuse 102 is actuated, or blown, the battery must be replaced because the battery's sealed housing prevents removal and replacement of the fuse. Like the previously described circuit to breaker, fuse 102 may couple adjacent cells together. Fuse 102 alternatively may be connected external the cells or coupled with circuit breaker 60.

Fuse 102 protects against "catastrophic failure" of the battery, such as a short circuit between the cells, which left unchecked, could severely damage the battery, as well as the vehicle and its users. Fuse 102 is designed to actuate, or blow, at a higher sustained current draw than circuit breaker 60. Therefore, under normal operation, neither the circuit breaker nor the fuse is actuated. When the current drawn achieves a sustained draw that exceeds a first threshold, circuit breaker 60 is actuated to stop the flow of current from the battery to the rest of the vehicle's electrical system. However, should the current draw continue to rise above a second threshold greater than the first threshold, then fuse 102 is actuated.

Breaker 60 and fuse 102 are adapted to actuate only if the current drawn therethrough exceeds the corresponding threshold for more than a determined time interval. This is because there may be short duration draws that exceed both thresholds, but because of their briefness do not pose dangers to the battery, vehicle or user. As an example, circuit breaker 60 may actuate at a threshold in the range of approximately 35–40 amps, but fuse 102 may not actuate until a sustained draw in the range of 45–50 amps is achieved. Despite this, instantaneous draws of up to and greater than 100 amps may be experienced, such as when an at-rest vehicle is quickly urged to its maximum full speed. Therefore, both the circuit breaker and fuse should be tuned to require a current draw that is sustained for a time period longer than those experienced for recurring pulses or surges that occur during normal operation of the vehicle. Typically, these surges or instantaneous draws last for milliseconds, while the sustained draws need to last at least a second, and often times a time period of several seconds, such as in the range of 2–5 seconds. Time periods and threshold currents outside of the above ranges are within the scope of the present invention, so long as the relative requirements discussed above are satisfied.

Figure 8:
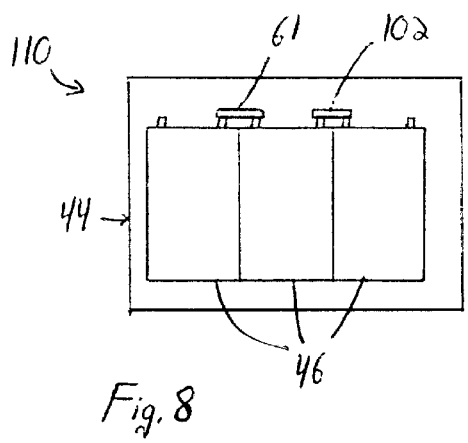
FIG. 8 is a schematic side-elevation view of another embodiment of a battery according to the present invention.
Figure 9:
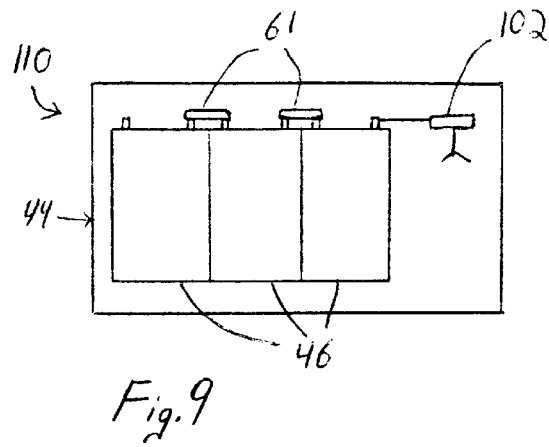
FIG. 9 is a schematic side-elevation view of another embodiment of the battery of FIG. 8.

In FIG. 8, another embodiment of the invented battery is shown and indicated generally at 110. Unlike the previously discussed batteries, battery 110 does not contain an internal circuit breaker. However, it does contain an internal fuse 102 housed within the battery's sealed housing to protect against catastrophic failure of the battery. Battery 110 may include additional fuses or breakers external the housing, such as to protect against overloads that exceed the normal operating conditions of the battery, but are not significant enough to actuate fuse 102. In FIG. 8, fuse 102 is connected in series between the cells. In FIG. 9, fuse 102 is connected in series external the cells.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
   a body having a plurality of wheels;
   at least one electrically powered motor adapted to rotatably drive at least one of the plurality of wheels; and
   at least one battery adapted to provide power to the at least one motor, wherein each of the at least one batteries comprises:
   a sealed housing;
   a plurality of cells sealed within the housing and electrically connected together;
   a non-resettable fuse sealed within the housing; and
   a resettable circuit breaker sealed within the housing and electrically connected with the plurality of cells.

2. The vehicle of claim 1, wherein the circuit breaker is adapted to automatically reset.

3. The vehicle of claim 1, wherein the circuit breaker is adapted to be reset manually by a user.

4. The vehicle of claim 3, wherein each of the at least one batteries includes a manual reset accessible by a user external the housing and in communication with the circuit breaker sealed within the housing.

5. The vehicle of claim 1, wherein the circuit breaker is connected in series with the plurality of cells.

6. The vehicle of claim 5, wherein the circuit breaker is connected between a pair of the plurality of cells.

7. The vehicle of claim 1, wherein each of the at least one batteries further includes a non-resettable fuse sealed within the housing.

8. The vehicle of claim 1, wherein the circuit breaker is adapted to actuate if the sustained current drawn from the battery exceeds a first threshold, and the fuse is adapted to actuate if the sustained current drawn from the battery exceeds a second threshold greater than the first threshold.

9. The vehicle of claim 1, wherein the circuit breaker is connected in series with the plurality of cells.

10. The vehicle of claim 9, wherein the circuit breaker is connected between a pair of the plurality of cells.

11. The vehicle of claim 1, wherein the body is at least substantially formed from plastic.

12. The vehicle of claim 1, wherein the vehicle is a reduced-scale version of a full-sized vehicle and is sized to be operated by a child.

13. A battery for a children's ride-on vehicle, the battery comprising:
    a sealed housing;
    a plurality of cells sealed within the housing and electrically connected together;
    a non-resettable fuse sealed within the housing; and
    a resettable circuit breaker sealed within the housing and electrically connected with the plurality of cells.

14. The battery of claim 13, wherein the circuit breaker is adapted to automatically reset.

15. The battery of claim 13, wherein the circuit breaker is adapted to be reset manually by a user.

16. The battery of claim 15, wherein the battery includes a manual reset accessible by a user external the housing and in communication with the circuit breaker sealed within the housing.

17. The battery of claim 13, wherein the circuit breaker is connected in series with the plurality of cells.

18. The battery of claim 17, wherein the circuit breaker is connected between a pair of the plurality of cells.

19. The battery of claim 13, further comprising a non-resettable fuse sealed within the housing.

20. The battery of claim 12, wherein the circuit breaker is adapted to actuate if the sustained current drawn from the battery exceeds a first threshold, and the fuse is adapted to actuate if the sustained current drawn from the battery exceeds a second threshold greater than the first threshold.

21. The battery of claim 12, wherein the circuit breaker is connected in series with the plurality of cells.

22. The battery of claim 21, wherein the circuit breaker is connected between a pair of the plurality of cells.

23. A battery for a children's ride-on vehicle, the battery comprising:
    a sealed housing;
    a plurality of cells sealed within the housing and electrically connected together; and
    a non-resettable and non-removable fuse sealed within the housing and electrically connected with the plurality of cells.

* * * * *

UNITED STATES PATENT AND TRADEMARK OFFICE
CERTIFICATE OF CORRECTION

PATENT NO. : 6,377,026 B1
DATED : April 23, 2002
INVENTOR(S) : Chuck J. Crofut et al.

It is certified that error appears in the above-identified patent and that said Letters Patent is hereby corrected as shown below:

<u>Column 6,</u>
Lines 1-3, please delete claim 7 without prejudice, as it recites structure already present in independent claim 1.
Lines 38-39, please delete claim 19 without prejudice, as it recites structure already present in independent claim 13.

Signed and Sealed this

Thirtieth Day of July, 2002

Attest:

Attesting Officer

JAMES E. ROGAN
*Director of the United States Patent and Trademark Office*